United States Patent Office 2,756,556
Patented July 31, 1956

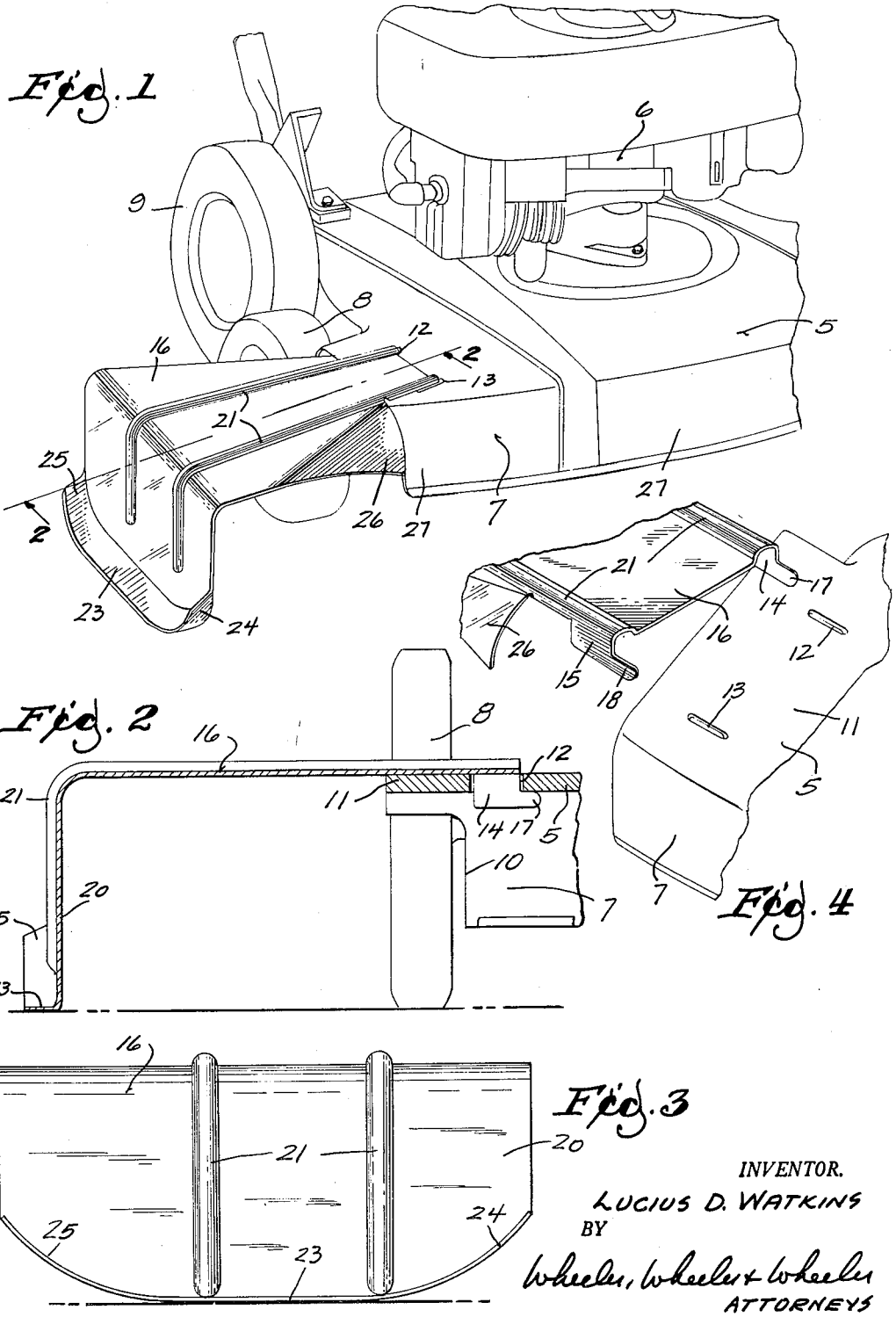

2,756,556

WINDROWING ATTACHMENT FOR A ROTARY LAWN MOWER

Lucius D. Watkins, Hartland, Wis., assignor to Outboard, Marine & Manufacturing Company, Waukegan, Ill., a corporation of Delaware Application June 29, 1955, Serial No. 518,810

4 Claims. (Cl. 56—189)

This invention relates to a windrowing attachment for a rotary lawn mower.

Ordinarily, it is desirable to avoid producing windrows in the use of a rotary mower. There are circumstances, however, as for example, when the grass is unusually long, when it may be desirable that the normally widely distributed output of the mower be confined to a definite windrow in immediate proximity to the path of advance.

The mower chosen for the exemplification of the invention is of a type in which there is a generally tangential discharge chute or inverted channel opening from the inverted pan-shaped housing in which the rotary blade operates. In accordance with the present invention, means is provided for supporting a baffle in a position parallel to the path of the mower and spaced outwardly from the end of the chute to intercept clippings discharged from the lower housing and to require these to fall in a windrow just outside the path traversed by the mower wheels. Specifically, the means for detachably mounting the baffle may conveniently comprise a plate having downwardly turned ears from which lugs project, the mower housing having slots to receive the lugs and the ears, the weight of the baffle and its support maintaining the lugs engaged internally with the housing to provide support for the baffle. An advantage of the described arrangement is the facility with which the attachment may be applied and removed.

In the drawings:

Fig. 1 fragmentarily illustrates a power mower having my improved windrowing baffle applied thereto.

Fig. 2 is a view taken in longitudinal section on the line 2—2 of Fig. 1 and showing the parts on a somewhat enlarged scale.

Fig. 3 is a view of the baffle in end elevation.

Fig. 4 is a view fragmentarily illustrating the baffle and the mower housing in perspective and in slightly separated positions.

The mower housing 5 comprises an inverted pan in which the cutting blade (not shown) rotates conventionally under the power of the engine 6. The housing extension in the form of inverted channel 7 constitutes a chute generally tangential with respect to the housing 5 to provide a lateral discharge port through which clippings are normally ejected laterally of the path of movement of the mower on its supporting wheels 8 and 9. Desirably, the wheel 8 projects partially into one side of the chute through the opening 10 therein provided as shown in Fig. 2.

For the purposes of the present invention, the top wall 11 of the housing 5 is provided with slots at 12 and 13 to receive downwardly turned ears 14 and 15 on an attachment arm comprising a panel plate 16 which thereupon derives support from the top wall 11 in the outer end of the chute 7. The ears 14 and 15 have forwardly projecting lugs 17, 18 which, in the application of the attachment, are inserted into the respective slots 12 and 13 in advance of ears 14, 15. Thus, in the position of the parts shown in Fig. 1 and Fig. 2, the lugs 17, 18 are engaged with the under surface of the top wall 11 to provide cantilever support for the member 16 and the baffle 20 which is carried at the free outer end thereof. Member 16 is desirably reenforced by ribs 21 which may be continued downwardly across the baffle as best shown in Fig. 3. As clearly shown in Fig. 4, the ears 14, 15 depend immediately outside ribs 21.

Baffle 20 extends downwardly substantially to ground level and in order that it may ride smoothly over the surface of the lawn which is being mowed, it is desirably formed to provide an integral flange 23 which curves upwardly at both ends at 24 and 25, respectively, to function as a shoe for supporting the baffle in its passage over the lawn and any inequalities therein. The baffle can rise and fall in relation to the housing 5 without becoming disconnected therefrom.

Desirably, the supporting plate 16 which carries the baffle 20 has wings at 26 engaged with a skirt portion 27 of the mower housing and extended outwardly to form the chute 7.

Obviously, the mounting and dismounting of the attachment is but the work of a moment. If the attachment is pivoted upwardly from the position shown in Fig. 1, the lugs 17 and 18 are readily released from the slots 12 and 13, whereupon the entire attachment is withdrawn without requiring a disconnection of any screws or bolts. Conversely, the insertion of the lugs in the slots with the attachment raised above the level of the housing 5, followed by the lowering of the attachment to the position shown, will securely interlock the parts for use.

The baffle 20 obviously is in a position to intercept substantially all of the clippings discharged through the chute 7 from the housing 5, thereby creating a windrow spaced just outside of the path of movement of the wheels 8 and 9.

I claim:

1. A windrowing attachment for a rotary mower comprising a housing having the form of an inverted pan having a top and peripheral skirt and provided with a lateral discharge port through said skirt and with a pair of spaced mounting slots, said attachment comprising a plate for overlying said port and resting on the housing and provided with spaced ears detachably and pivotally engageable in the slots and from which lugs project for engagement with the housing, the plate being provided at its end remote from said ears with a depending baffle positioned to extend across the path of discharge from the port at a point laterally spaced from the housing when the ears are engaged in the housing slots.

2. The device of claim 1 in which the plate has spaced depending wings positioned to abut the housing skirt when the attachment is in use.

3. The device of claim 1 in which the plate and baffle and ears are a single piece of sheet metal having ribs extending longitudinally of the plate and immediately at the outside of which the ears depend.

4. The device of claim 1 in which the baffle is provided with a shoe adapted for support from the ground traversed by the baffle while in use, the pivoting of the ears in the housing slots accommodating movement of the attachment respecting the mower housing.

References Cited in the file of this patent

UNITED STATES PATENTS

| 2,489,059 | Surgi | Nov. 22, 1949 |
| 2,495,032 | Stuhl | Jan. 17, 1950 |
| 2,621,457 | Rosenberg | Dec. 16, 1952 |
| 2,708,334 | Coners | May 17, 1955 |